D. BURTCH.
CENTRIFUGAL SEPARATOR.
APPLICATION FILED DEC. 31, 1914.
1,161,839.
Patented Nov. 30, 1915.
4 SHEETS—SHEET 4.
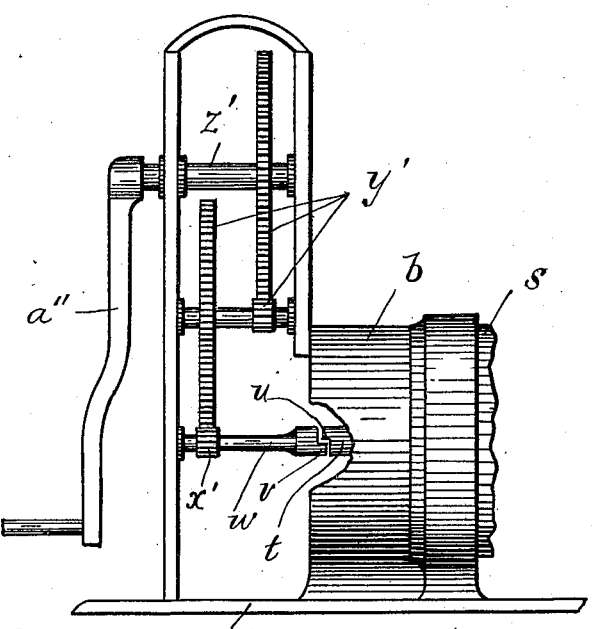
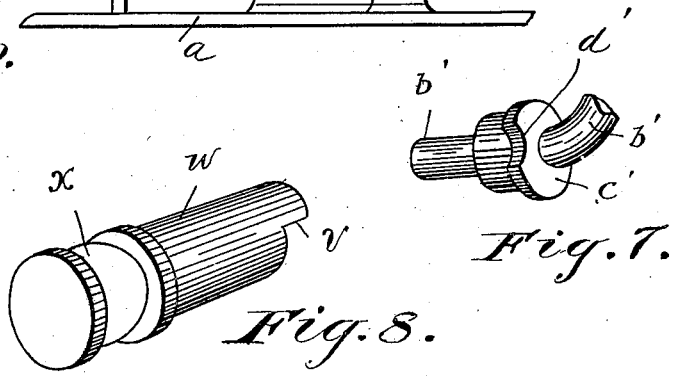
Witnesses.
Inventor.

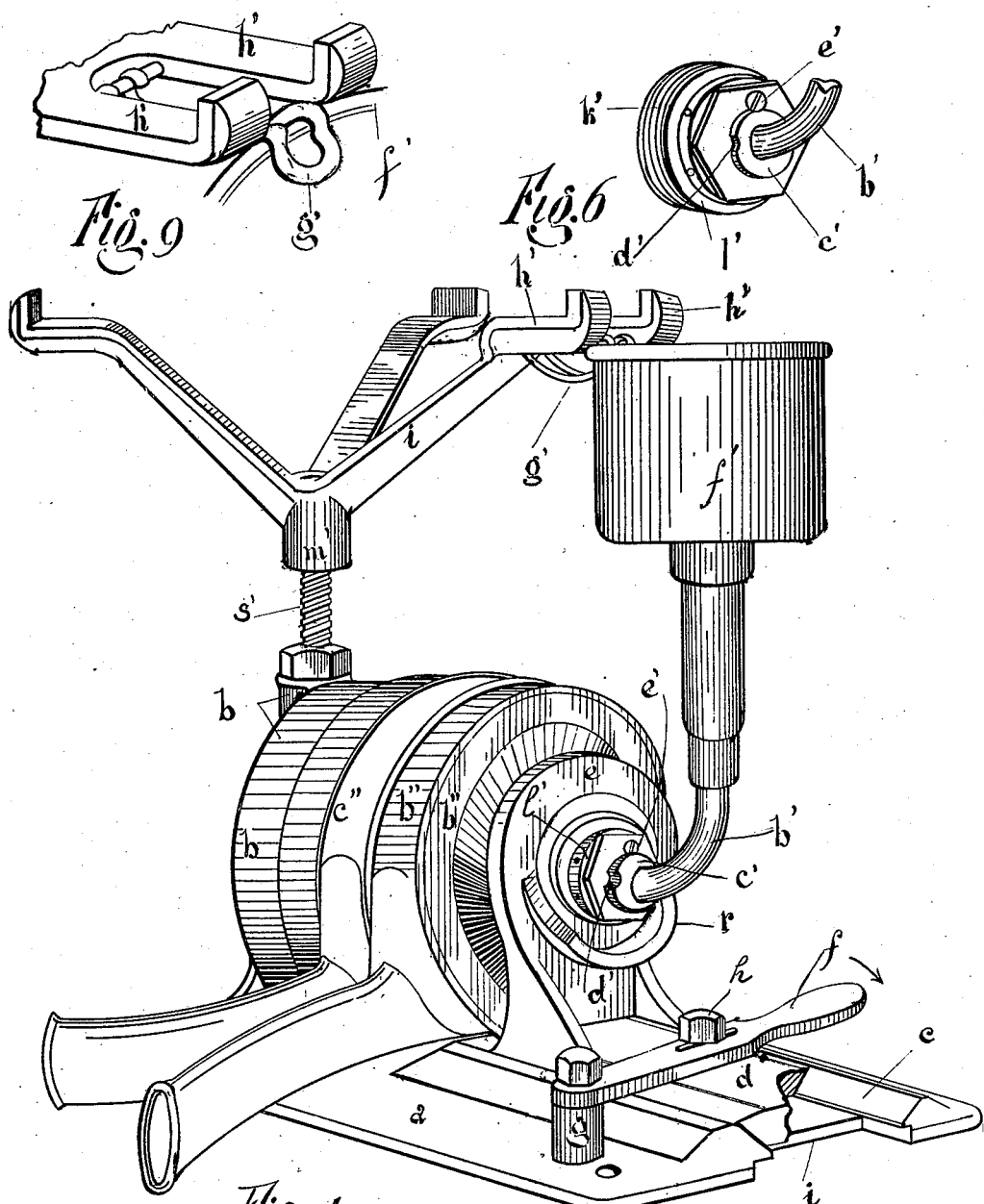

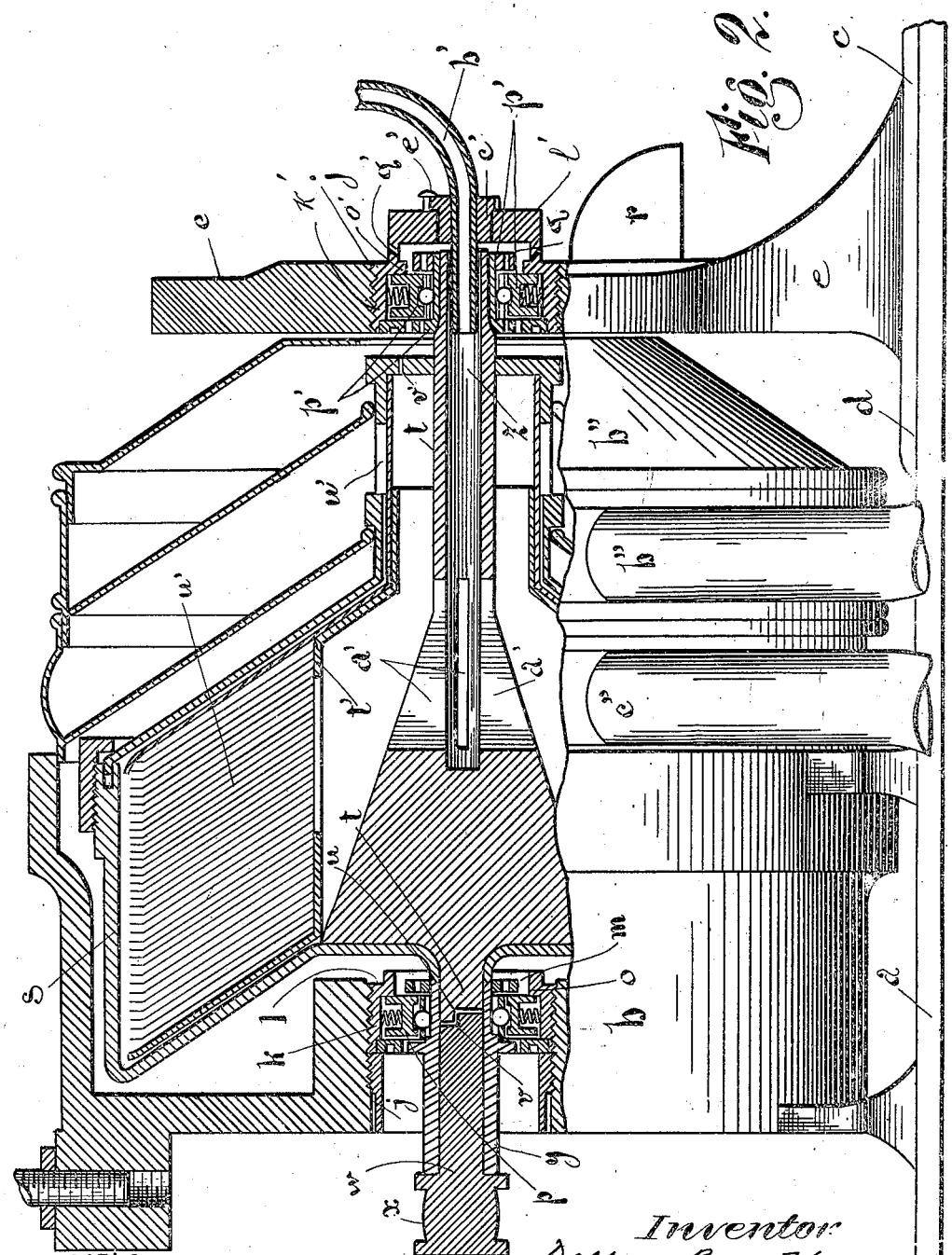

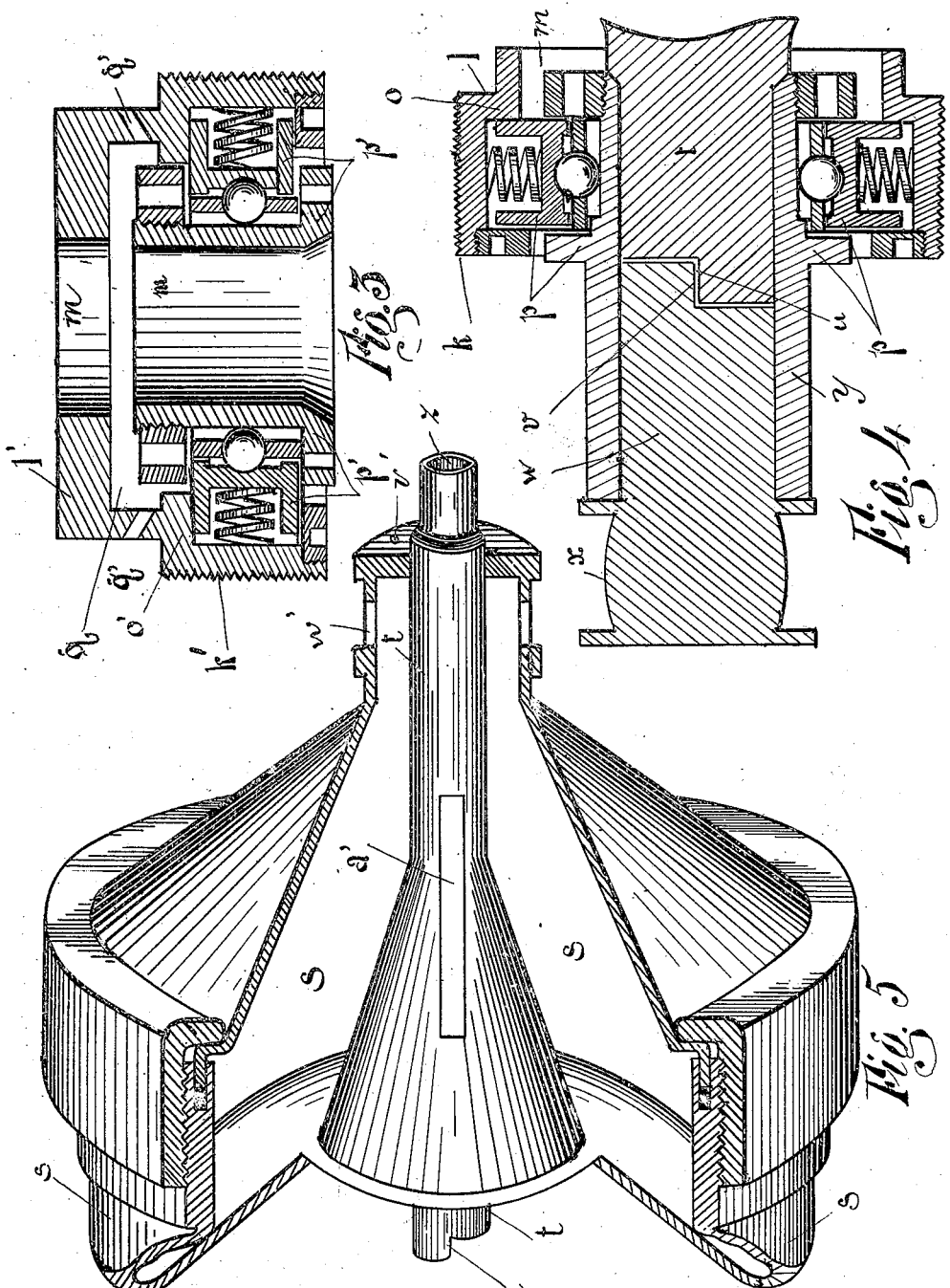

UNITED STATES PATENT OFFICE.

DELBERT BURTCH, OF TORONTO, ONTARIO, CANADA.

CENTRIFUGAL SEPARATOR.

1,161,839.   Specification of Letters Patent.   Patented Nov. 30, 1915.

Application filed December 31, 1914.   Serial No. 879,884.

*To all whom it may concern:*

Be it known that I, DELBERT BURTCH, of the city of Toronto, in the county of York and Province of Ontario, Dominion of Canada, have invented certain new and useful Improvements in Centrifugal Separators; and I hereby declare that the following is a full, clear, and exact description of the same.
My invention relates to certain new and useful improvements in centrifugal separators, such as are used in the separation of cream from milk, and the objects of my invention are:—(*a*) to provide the rotative vessel or bowl with means by which it can be directly driven from any suitable source of power, this means preferably consisting of a horizontal tubular shaft, mounted in anti-friction bearings, and formed at one end with a clutch member removably engaging with a corresponding clutch member having a pulley or gearing, to which the motive power is applied; (*b*) to so arrange this tubular shaft that it can be used as a milk inlet, this being accomplished by making the shaft hollow from the interior of the vessel or bowl to the end of the shaft opposite the clutch member and forming the shaft within the vessel or bowl with orifices or slots communicating with its bore, so that the fluid entering it can flow into the bowl; (*c*) to so construct the anti-friction bearings that the fluid contents of the rotative vessel or bowl cannot enter the ball races and impair the anti-friction character of the bearings, this being accomplished by providing the bearings with casings containing drainage chambers having drainage openings through which the drip or back-wash from the vessel or bowl can flow away after entering the drainage chamber; (*d*) to provide the separator with a feed pipe loosely centered in the hollow end of the tubular shaft and formed with a collar, the casing of the adjacent bearing being provided with clamping means engaging the collar, to lock the feed pipe against the casing and prevent its movement during the rotation of the shaft; (*e*) to so arrange the frame that one of the bearings can be adjusted to the other, lengthwise of the shaft, to permit of the removal and replacement of the vessel or bowl, and to so arrange the frame that a protective casing is provided for the bowl; and (*f*) to provide the pan support with a spring latch engaging the cup at the upper end of the feed pipe, and correctly positioning it below the outlet of the milk pan resting upon the support.

In the drawings:—Figure 1, is a perspective view of the centrifugal separator; Fig. 2, is a vertical sectional elevation of the same; Figs. 3 and 4, are sectional detail views of the front and rear bearings for the shafts; Fig. 5, is a broken perspective view of the rotative vessel or bowl; Fig. 6, is a fragmentary detail view of the feed pipe and the casing for the front bearing; Fig. 7, is a detail view of the outlet end of the feed pipe; Fig. 8, is a perspective view of the driving clutch member; Fig. 9, is a fragmentary perspective view of the pan-supporting standard and latch for holding the feed cup; and, Fig. 10, is a detail view showing an alternative means for driving the rotative vessel.

Like characters of reference refer to like parts throughout the specification and drawings.

The frame consists of a base *a*, having, at one end, a cylindrical standard *b*, and, at the other end, a slideway *c* for the base *d* of the other standard *e*. The base *b* and standard *e* are moved to and from the standard *b* by means of a lever *f*, pivoted at one end on a stud *g* forming part of the base *a*, and connected to the base *d* by means of a screw or bolt *h*, which extends through the base *d* and enters a plate *i* engaging the underside of the slideway *c*, to prevent the inadvertent separation of the base *d* and standard *e* from the base *a*.

Each of the standards *b* and *e* is bored axially of the frame and contained in these bores *j* are cylindrical casings *k*, *k'* having side plates *l*, *l'* with circular openings *m* therein and circular thrust shoulders *o*, *o'* within the casings to receive the thrust of the bearings *p*, *p'*. The thrust shoulder *o'* within the casing *k'* is separated from the side plate *l'* to form a drainage chamber *q*, and formed through the casing *k'* are drainage openings *q'*, through which the contents of the drainage chamber can flow out onto the lip *r* on the outer side of the standard *e* and then away from the apparatus.

The rotative vessel or bowl is provided with a horizontal shaft *t* journaled in the bearings *p*, *p'*. That end of the shaft journaled in the bearing *p* is formed with a clutch member *u* which engages with a clutch member *v* on the inner end of a stud *w*, preferably provided with a pulley $x$, as shown in Figs. 2 and 8, by which power can be directly applied to the stud and clutch member $v$, to cause the rotation of the horizontal shaft $t$, and the rotative vessel or bowl. The stud $w$, as shown, in Figs. 2 and 4, is contained within the outer end of a sleeve $y$ forming part of the bearing $p$. When the shaft $t$ is in position within the frame, the adjacent end of the shaft and its clutch member $u$ are contained within the inner end of the sleeve $y$ which then operates to keep the clutch members in engagement and prevents their radial separation. The opposite end of the horizontal shaft $t$ extends to the outer side of the bearing $p'$ and the shaft, from its outer end to the interior of the rotative vessel or bowl, is formed with a bore $z$, and within the interior of the rotative vessel or bowl, is formed with orifices or slots $a'$ through which the fluid can enter the bowl. The end of the shaft $t$ projects slightly beyond the outer side of the bearing $p'$ so that the drainage or leakage from the shaft can descend to the bottom of the drainage chamber $q$ and pass through the drainage orifices $q'$ to the exterior of the casing, without any possibility of it getting into the ball races and impairing the anti-friction qualities of the bearing.

Extending through the circular opening $m$ in the side plate $l'$ is the end of the feed pipe $b'$ which is loosely centered within the adjacent end of the tubular part of the shaft $t$. The feed pipe $b'$, on the outer side of the plate $l'$, is formed with a collar $c'$ notched, as shown at $d'$, to clear the clamping screw $e'$ when the end of the feed pipe is being inserted into the bore of the horizontal shaft $t$. When inserting the end of the feed pipe into the bore of the tubular shaft $t$, the notch $d'$ is brought into alinement with the clamping screw $e'$ and the collar $c'$ is pressed against the casing side or plate $l'$ until it clears the head of the clamping screw, the feed pipe then being turned to an upright position; the clamping screw during such turning movement engaging the collar and locking it tightly against the casing. At the upper end of the feed pipe is a feed cup $f'$ and engaging the rim of the feed cup $f'$ is a spring latch $g'$ contained between the forks $h'$ of one of the arms $i'$ of the pan-supporting spider. The pan-supporting spider, as shown in the drawings, consists of three arms extending radially from a hub $m'$ adjustably connected by a screw threaded stud $s'$ to the standard $b$.

For cream separation purposes, the rotative vessel or bowl $s$ may be provided with a split wing distributer $t'$, skimming disks $u'$, cream outlet $v'$, and skim milk outlet $w'$; but, as no claim is made to these features, it will not be necessary to describe them in detail, nor to describe their action in the separation of the fluid contents of the rotative vessel or bowl.

In Fig. 10, I have shown the stud $w$ to be provided with a pinion $x'$ driven by a gear train $y'$ from a shaft $z'$, preferably turned by a crank $a''$.

To place the shaft of the rotative vessel or bowl $s$ in its bearings $p$, $p'$, the handle of the lever $f$ is moved in the direction indicated by arrow in Fig. 1, which movement has the effect of drawing the standard $e$ away from the standard $b$ to effect a separation between these standards of sufficient interval to permit of the rotative vessel or bowl $s$ being inserted in the cylindrical standard $b$ with the clutch end of the shaft in the bearing $p$. The handle of the lever $f$ is then moved in the opposite direction, which has the effect of moving the standard $e$ toward the standard $b$ to bring the bearing $p'$ into position to receive the opposite end of the shaft $t$ and lock the parts against lengthwise movement when the screw or bolt $h$ is turned to clamp the plate $i$ against the slideway $c$; the shaft $t$ then being journaled in the bearings to revolve when power is applied to the clutch member $v$, this clutch member, when the standard $e$ is locked in its adjusted position, engaging with the clutch member $u$ and directly driving the rotative vessel or bowl.

The end of the feed pipe $b'$ is inserted into the tubular end of the shaft $t$ and locked against rotation by means of the clamping screw $e'$ engaging its collar $c'$ and the spring latch $g'$ engaging the rim of the feed cup $f'$. The milk from the pan which may be supported on the spider can then flow into the feed cup and through the feed pipe to the tubular part of the shaft $t$ and enter the rotative vessel or bowl through the orifices or slots $a'$, the cream being separated from the skim milk by the skimming disks $u'$ and the cream passing through the outlet $v'$ and the skim milk through the outlet $w'$ to the cream and skim milk pans $b''$ and $c''$ respectively.

During the separation of the cream and milk the rotative vessel or bowl is caused to revolve at a high rate of speed by power applied through the stud $w$ and clutch members $v$ and $u$ to the horizontal shaft $t$, the bowl and shaft being preferably accurately balanced and the bearings correctly alined so that the centrifugal motion of the bowl is practically negligible, this being advisable to eliminate the wear upon the bearings but not vital to the successful operation of the separator, which will steadily revolve in its bearings, whether the bowl is balanced or not.

When the separation of the cream is effected, water is fed through the pipe $b'$ and tubular part of the shaft $t$ into the rotative vessel or bowl, the presence of which within the bowl washes the cream from the distributer and skimming disks and forces it through the cream outlet; the water, during the rotation of the bowl, passing through the skim milk outlet in the usual way. When the revolution of the rotative vessel or bowl ceases, the water remaining in it above the level of the lowermost part of the bore of the tubular shaft will drain out through the shaft; and, to take care of this drainage, the chamber $q$ with the drainage orifices is provided.

Having thus fully described the nature of my invention, what I claim as new and desire to secure by Letters Patent is:

1. A centrifugal separator comprising a rotative vessel, a horizontal shaft for the vessel, one end of which is provided with power-transmitting means and the other end of which is tubular with orifices communicating with the interior of said vessel, in combination with a stationary standard, and a movable standard having bearings in which said shaft is journaled, a cylindrical casing for one of said standards inclosing the base of the rotative vessel, and a set of pans extending from the cylindrical casing to the other standard inclosing the remainder of the rotative vessel.

2. A centrifugal separator comprising a rotative vessel, a horizontal shaft for the vessel, one end of which is provided with power transmitting means and the other end of which is tubular with orifices communicating with the interior of said vessel, in combination with a stationary standard having a bearing in which one end of the shaft is journaled, and a cylindrical casing inclosing the base of the rotative vessel, a movable standard having a bearing in which the other end of the shaft is journaled, and a set of pans inclosing the said vessel between the cylindrical casing and the opposite standard.

3. A centrifugal separator comprising a rotative vessel having a horizontal shaft, a base, a standard at one end of the rotative vessel having a bearing for said shaft, said bearing having a cylindrical casing to partly inclose the rotative vessel, a movable standard at the other end of said vessel having a bearing for said shaft, a set of pans between said standards inclosing the remainder of said vessel, and means for adjusting the movable standard relatively to the vessel.

Toronto, December 2nd, 1914.

DELBERT BURTCH.

Witnesses:
P. DE MONTIGNY-KENNEDY,
C. H. RICHES.

Copies of this patent may be obtained for five cents each, by addressing the "Commissioner of Patents, Washington, D. C."